(12) United States Patent
Takegoshi

(10) Patent No.: US 7,564,575 B2
(45) Date of Patent: Jul. 21, 2009

(54) IMAGE FORMING APPARATUS AND METHOD OF CONTROLLING IMAGE FORMING APPARATUS

(75) Inventor: Hidefumi Takegoshi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 893 days.

(21) Appl. No.: 11/054,124

(22) Filed: Feb. 8, 2005

(65) Prior Publication Data
US 2005/0179941 A1 Aug. 18, 2005

(30) Foreign Application Priority Data
Feb. 16, 2004 (JP) .............................. 2004-038344

(51) Int. Cl.
*G06F 15/00* (2006.01)
(52) U.S. Cl. .................... 358/1.14; 358/1.13; 358/1.15; 399/10; 399/11; 399/79; 399/80; 399/82
(58) Field of Classification Search ....... 358/1.13–1.16; 399/10, 11, 79, 80, 82
See application file for complete search history.

(56) References Cited

U.S. PATENT DOCUMENTS

| | | | | |
|---|---|---|---|---|
| 6,202,092 | B1 * | 3/2001 | Takimoto | 709/225 |
| 6,762,853 | B1 * | 7/2004 | Takagi et al. | 358/1.15 |
| 6,935,239 | B2 * | 8/2005 | Mizuno et al. | 101/483 |
| 2001/0050781 | A1 * | 12/2001 | Kujirai | 358/1.15 |
| 2003/0202202 | A1 * | 10/2003 | Miyata | 358/1.14 |

FOREIGN PATENT DOCUMENTS

| | | |
|---|---|---|
| CN | 1215868 A | 5/1999 |
| JP | 6-197209 | 7/1994 |
| JP | 9-185474 A | 7/1997 |
| JP | 2003-058344 | 2/2003 |
| JP | 2003-76529 | 3/2003 |
| JP | 2003-204412 | 7/2003 |

OTHER PUBLICATIONS

Notification of the First Office Action from the Patent Office of the People's Republic of China dated Aug. 18, 2006.
Japan Patent Office, Office Action issued Aug. 1, 2007 for Japanese Patent Application No. 2004-38344.
Japan Patent Office, Notification of Reasons for Rejection for Application JP 2004-038344, Mail Date Sep. 4, 2007.

* cited by examiner

*Primary Examiner*—Chan S Park
(74) *Attorney, Agent, or Firm*—SoCal IP Law Group LLP; Steven C. Sereboff; M. Kala Sarvaiya

(57) ABSTRACT

It is possible to print a test page or a set page held originally in a controller regardless of printing limitation, even when a division management function works. A printer controller judges whether or not input identification information added to a printing job agrees with registered division management identification information at a printing request time of the printing job, permits a printer unit to print the printing job at an agreement time, and does not permit the printing at a disagreement time. Moreover, when special division management identification information is detected instead of the input identification information at the printing request time, existing information stored beforehand in the printer controller is printed.

18 Claims, 3 Drawing Sheets

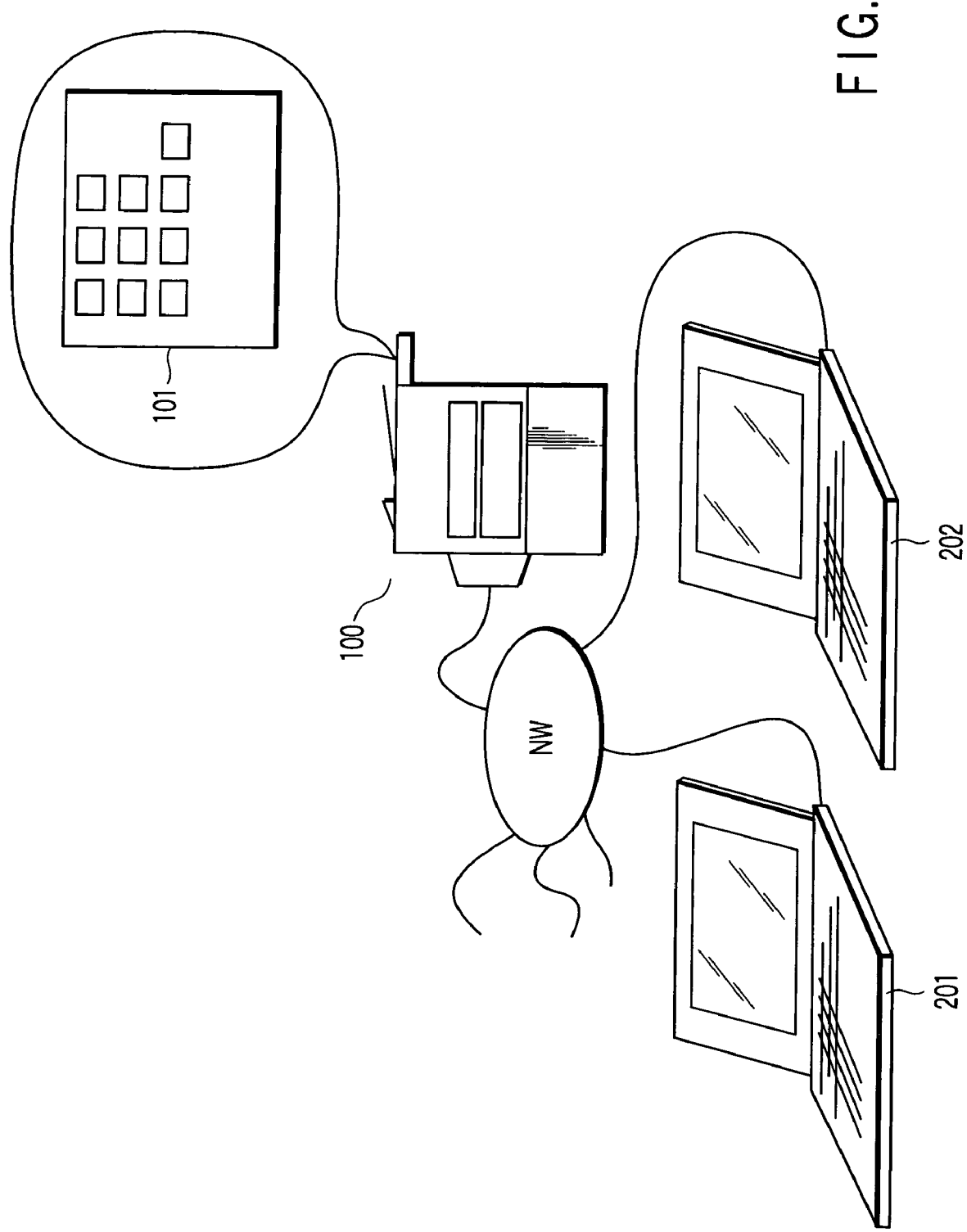
F I G. 1

IMAGE FORMING APPARATUS AND METHOD OF CONTROLLING IMAGE FORMING APPARATUS

CROSS-REFERENCE TO RELATED APPLICATIONS

This application is based upon and claims the benefit of priority from prior Japanese Patent Application No. 2004-038344, filed Feb. 16, 2004, the entire contents of which are incorporated herein by reference.

BACKGROUND OF THE INVENTION

1. Field of the Invention

The present invention relates to an image forming apparatus having a copy function and a print-out function, and having a so-called division management function of limiting the copy function and/or the print-out function, and a method of controlling the apparatus.

2. Description of the Related Art

There exists an image forming apparatus having a print-out function, and a division management function of limiting this print-out function. The division management function is a function capable of classifying and counting the number of printed sheets for each division, or a function of prohibiting use of the image forming apparatus by a non-registered division, for example, in a case where one image forming apparatus is used by a plurality of divisions.

For this purpose, in the image forming apparatus, a division management ID to permit printing can be registered in a printer controller beforehand. For example, a printing job is sent from an external printer driver of a personal computer in a state in which the division management function is set in such a manner as to have an operative state. In this case, the printer controller checks an ID attached to the sent printing job. If this sent ID agrees with the registered division management ID, the printing is permitted. If the sent ID disagrees with the registered division management ID, printing is not permitted (e.g., Jpn. Pat. Appln. KOKAI Publication No. 6-197209).

The above-described conventional image forming apparatus having the division management function is constituted in such a manner as to permit printing when the sent ID agrees with the registered division management ID. Therefore, the function has no relation to printing limitation, and a problem has occurred wherein a test page or a set page originally held in the controller cannot be printed.

BRIEF SUMMARY OF THE INVENTION

One object of the present invention is to provide an image forming apparatus and a method of controlling the apparatus, in which a test page or a set page originally held in a controller is printable regardless of printing limitation, even when a division management function works.

According to one mode for carrying out the present invention, in an image forming apparatus having a scanner unit which reads a draft, a printer unit which prints scan data read by the scanner unit or print data transmitted from the outside, and a printer controller which controls a printing operation of the printer unit, registered division management identification information of a division which is to be permitted to print data is stored, and input identification information added to the printing job is detected at a printing request time of a printing job. It is judged whether or not the detected input identification information agrees with the stored registered division management identification information. The printer unit is permitted to print the printing job in a case where agreement is judged as a result of judgment, and the printing of the printing job is not permitted at the time of disagreement. When identification information indicating special printing information is detected as the identification information, information stored in a memory is printed regardless of the judgment result.

By the above-described means, it is possible to print a test page indicating a printing state or a set page indicating printing set information which is an existing page held originally in a controller regardless of printing limitation, even when a division management function works.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an example of a used state of an image forming apparatus to which the present invention is applied;

DETAILED DESCRIPTION OF THE INVENTION

Hereinafter, embodiments of the present invention will be explained in detail with reference to the attached drawings.

FIG. 1 shows a use example of an image forming apparatus 100 to which the present invention is applied. The image forming apparatus 100 has an operation unit 101, and an input required by a user to copy, copying sheet number information or the like, can be given from this operation unit. As described later, the apparatus has a function of printing out a printing job. Division management identification information (division management ID) can be registered from the operation unit 101. When this division management ID is registered, the image forming apparatus 100 accepts a job from a registered division, and does not accept a job from a non-registered division. Limitation information (limitation of a total printing sheet number for each division, etc.) to limit, even a job from a division whose division management ID has been registered, can be given from the operation unit 101.

Furthermore, the printing job can be sent to the image forming apparatus 100 from personal computers (terminal apparatuses) 201, 202, . . . via a network. When the printing job is sent from the terminal apparatus 201 or the like, the image forming apparatus 100 basically prints and outputs printing information.

Figure 2:
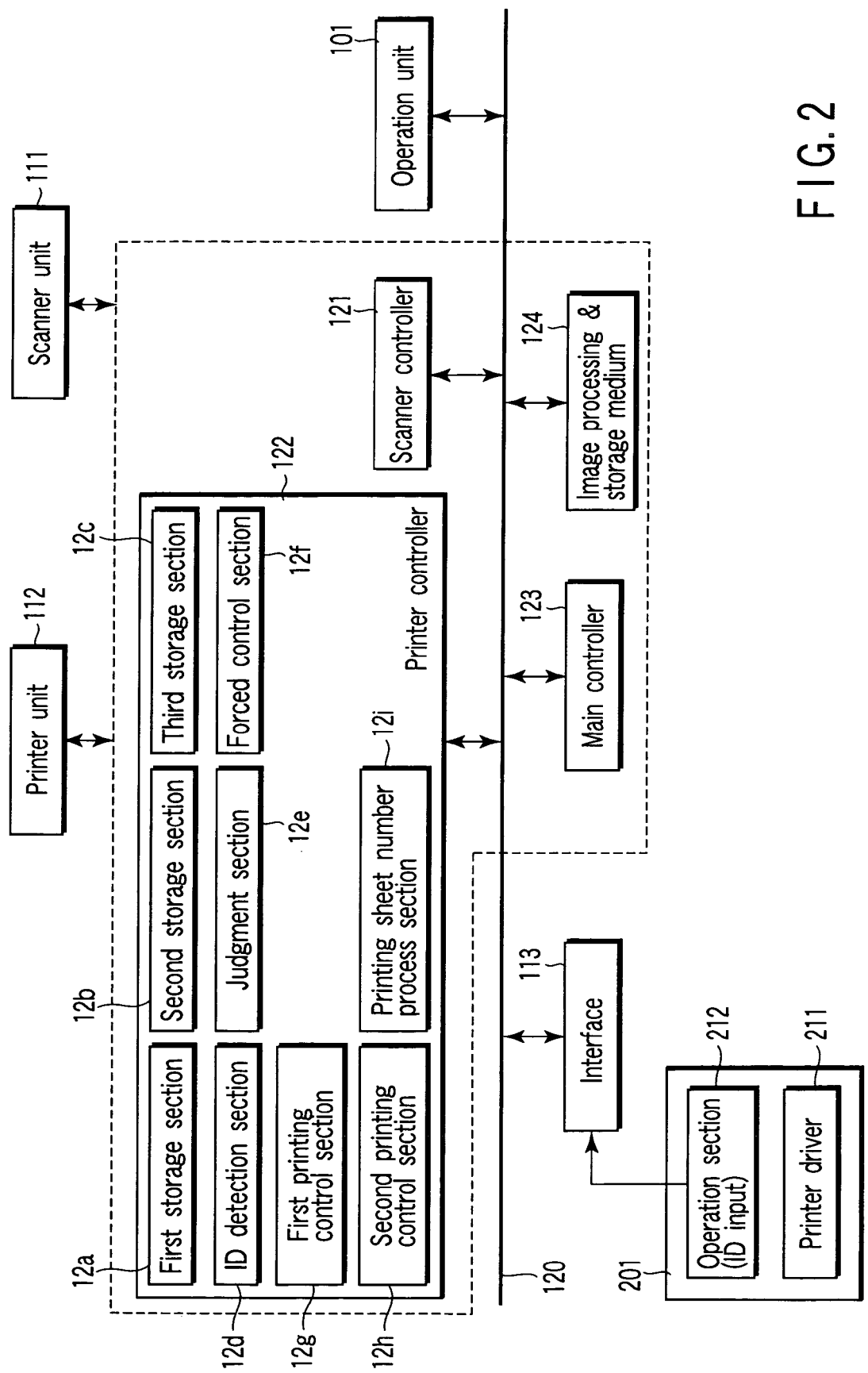
FIG. 2 is a block diagram showing a main part of the present invention.

FIG. 2 shows an information processing system of the apparatus of FIG. 1 in functional blocks. A main bus 120 is connected to the operation unit 101. The main bus is also connected to a scanner controller 121 for controlling a scanner unit 111, and a printer controller 122 for controlling a printer unit 112. The main bus 120 is also connected to a main controller 123, and an image processing unit and storage medium 124.

The terminal apparatus 201 includes an operation section 211, a printer driver 212, a display and the like. When the printing job is transmitted to the image forming apparatus 100 by an operation of the operation section 211, the printing job is once stored in the storage medium via an interface of the image forming apparatus 100. Information such as a printed sheet number, printing direction, and division management identification information (division management ID) is added to the printing job. Next, it is judged by the printer controller 122 whether or not to permit the printing of the printing job. When the printing job is sent, the main controller 123 sends the printing job to the storage medium, sets the printer controller 122 to an operative state, and starts operations of a division management section, and a printed sheet limiting section.

The printer controller 122 includes first to third storage sections 12a, 12b, 12c, an ID detection section 12d, a judgment section 12e, a forced control section 12f, first and second printing control sections 12g, 12h, a printed sheet number process section 12i and the like. A memory (not shown) is also included.

The first storage section 12a stores registered division management identification information of a division which is permitted to print data. The ID detection section 12d detects input identification information added to the printing job at a printing request time of the printing job. The judgment section 12e judges whether or not the input identification information detected by the ID detection section 12d agrees with the registered division management identification information stored in the first storage section 12a. The first printing control section 12g permits the printer unit 112 to print the printing job, when the judgment result of the judgment section 12e indicates agreement, and does not permit the printing of the printing job at a disagreement time. The forced control section 12f prints information stored in the memory regardless of the judgment result of the judgment section 12e, when the ID detection section 12d detects identification information indicating special printing information.

The second storage section 12b stores information of division limited sheet number in order to manage the number of printed sheets with respect to the division. The second printing control section 12h counts the number of printed sheets, and judges whether or not the number exceeds the division limited sheet number stored in the second storage section 12b, when the printing is requested from the division. Moreover, when the number is within the limited sheet number, the printer unit 112 is permitted to print the data. When the number exceeds the limited sheet number, the printing is not permitted. The third storage section 12c sorts out and stores the division management identification information of the division which is not permitted by the first printing control section 12g or the second printing control section 12h.

Figure 3:
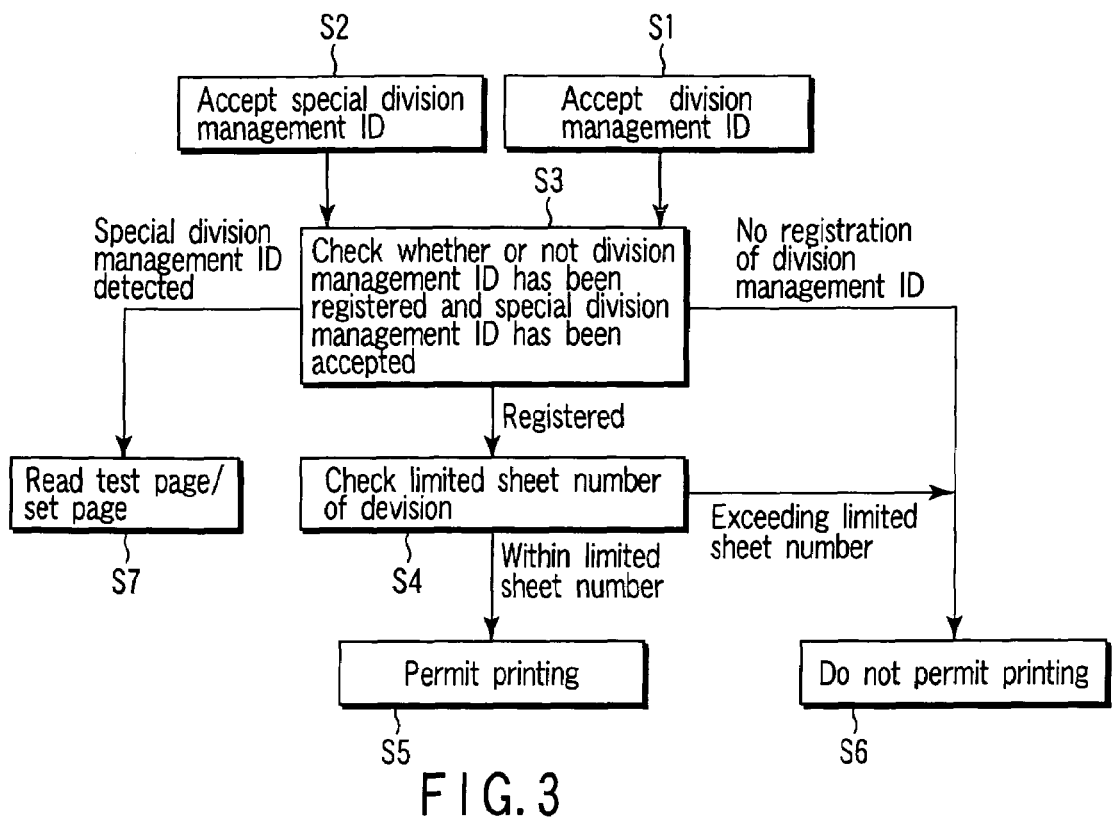
FIG. 3 is a flowchart showing an operation example of the main part of the present invention.

FIG. 3 shows mainly a function in the printer controller 122, and operation states of a division management section and a printed sheet number control section in a flowchart. In step S1, the division management ID (hereinafter referred to as input identification information) added to the sent printing job is accepted. Also in step S2, it is possible to input special division management ID to the printer controller 122. In step S3, the input identification information is compared with registered division management identification information registered beforehand. When the input identification information agrees with the registered division management identification information, the limited sheet number of the corresponding division is checked, and it is inspected whether or not the number exceeds a limited sheet number registered beforehand. As a result of the inspection, the printing is permitted within the limited sheet number (step S5). However, when the input identification information disagrees with the registered division management identification information, and when the division limited sheet number is exceeded, the printing is not permitted (step S6). Therefore, in this case, the printing is not performed.

Furthermore, this system is capable of accepting the special division management ID (special division management identification information). The special division management identification information is identification information assigned to information of a test page or a set page originally held by the printer controller 122.

The test page is printed in order to confirm a printing state, when a toner cartridge or a component is changed, and the set page is printed in order to confirm settings of information of printing resolution, printing speed, attached options and the like of the image forming apparatus 100, or information such as set environment of the image forming apparatus 100 on the network. This information is not sent from the outside, and is stored in the printer controller 122, a memory of the printer unit, or a memory of another unit. Therefore, special division management identification information that is not usually used is assigned. Moreover, if necessary, the printing of the test page or the set page can be realized when the above-described special division management identification information is given to the printer controller 122. The special division management identification information may be input not only from the operation unit 101 but also from the terminal apparatus 201.

Figure 4:
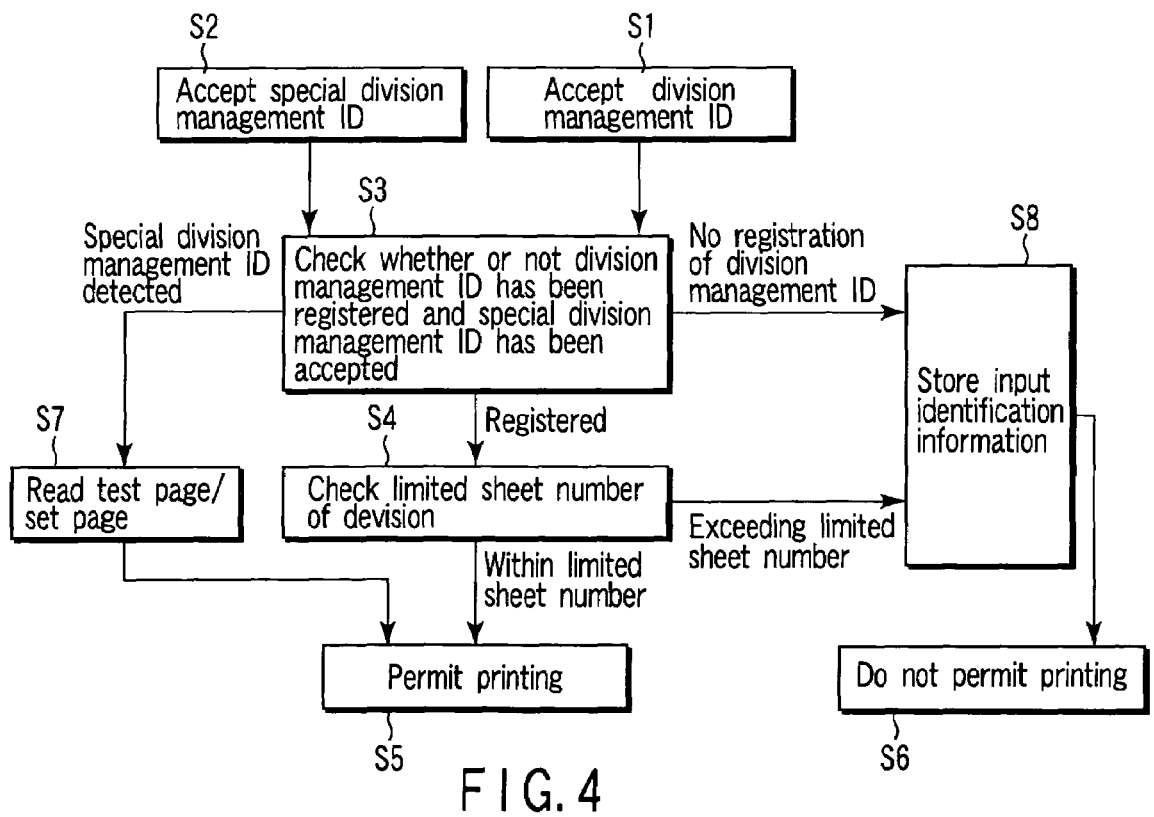
FIG. 4 is a flowchart showing another operation example of the main part of the present invention.

FIG. 4 is a flowchart of the main part of the present invention in another embodiment. This flowchart is different from that of FIG. 3 in that step S8 is added. Here, when there is a printing request from a non-registered division, non-registered division management identification information is accumulated, and information such as the number of printing request times can be stored. A user or a manager of the image forming apparatus 100 can display the accumulated information to confirm the information. Accordingly, it is possible to find a division which has requested the printing by mistake, or which is to utilize the image forming apparatus 100.

Furthermore, even when the limited printed sheet number is exceeded, the information of the division can be stored in the memory. Accordingly, reference information for changing the setting of the limited sheet number can be obtained.

The system of the present invention is effective in a case where one image forming apparatus is used in common by a plurality of divisions. The system is also effective in a case where a plurality of divisions share payment of use charges/rental charges of the image forming apparatus.

Printing has been described above, but the present invention is applicable to copying. To perform copying, the division management ID (input identification information) is input together with information such as copying sheet number, for example, from an operation unit of the image forming apparatus 100. When the division management function is in an enabled state, a display screen of the operation unit of the image forming apparatus 100 requests the input of the division management ID (input identification information).

It is to be noted that the present invention is not limited to the above-described embodiments, and constituting elements can be modified and embodied without departing from the scope of the present invention in an implementing stage.

Various inventions can be formed by an appropriate combination of a plurality of constituting elements described in the above-described embodiments. For example, some of the constituting elements described in the embodiments may be omitted. Furthermore, the constituting elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus having a printer unit which prints print data transmitted, and a printer controller which controls a printing operation of the printer unit,
   wherein the printer controller comprises:
   a first storage section to store registered division management identification information of a division which is to be permitted to print the print data;
   a detection section which detects input identification information added to a printing job at a printing request time of the printing job;
   a judgment section which judges whether or not the input identification information detected by the detection section agrees with the registered division management identification information stored in the first storage section;
   a first printing control section which permits the printer unit to print the printing job in a case where the judgment section judges that the information agree with each other and which does not permit the printing of the printing job at the time of disagreement;
   a second storage section which stores information of a division limited sheet number in order to manage the number of printed sheets with respect to the division;
   a second printing control section which counts the number of the printed sheets at the printing request time of the division and which judges whether or not the division limited sheet number stored in the second storage section is exceeded and which permits the printer unit to print the data within the limited sheet number and which does not permit the printer unit in a case where the limited sheet number is exceeded;
   a memory which stores a test page or a set page; and
   a control section which prints the test page or the set page when the detection section detects an input of special division management identification information
   wherein the divisional printing limitation is not applied when the input of the special division management identification information is detected.

2. The image forming apparatus according to claim 1, further comprising:
   a third storage section to sort out and store division management identification information of a division which is not permitted by the first printing control section or the second printing control section.

3. The image forming apparatus according to claim 1, further comprising a scanner unit which reads a draft and sends the read data to the printer unit.

4. The image forming apparatus according to claim 1, wherein the number of printed sheets is added to a printing job.

5. The image forming apparatus according to claim 1, wherein the test page is information in order to confirm a printing state, when a toner cartridge or a component is changed.

6. The image forming apparatus according to claim 1, wherein the set page is information in order to confirm settings of information of printing resolution, printing speed, attached options of the image forming apparatus, or information such as set environment of the image forming apparatus on the network.

7. A method of controlling an image forming apparatus having a printer unit which prints print data, and a printer controller which controls a printing operation of the printer unit, the method comprising:
   storing registered division management identification information of a division which is to be permitted to print the print data;
   detecting input identification information added to a printing job at a printing request time of the printing job;
   judging whether or not the detected input identification information agrees with the stored registered division management identification information;
   permitting the printer unit to print the printing job in a case where it is judged that the information agree with each other as a judgment result;
   not permitting the printing of the printing job, when the judgment result indicates disagreement;
   counting the number of printed sheets at the printing request time of the division in order to manage the number of the printed sheets with respect to the division;
   judging whether or not the division limited sheet number stored in a second storage section is exceeded;
   permitting the printer unit to print the data within the limited sheet number; and
   not permitting the printer unit in a case where the limited sheet number is exceeded; and
   printing a test page or a set page stored in a memory when an input of special division management identification information is detected
   wherein the divisional printing limitation is not applied when the input of the special division management identification information is detected.

8. The method of controlling the image forming apparatus according to claim 7, further comprising:
   sorting division management identification information of a division which is not permitted to print the print data.

9. The method of controlling the image forming apparatus according to claim 7, wherein a scanner unit is provided, the method comprises:
   reading a draft and sending the read data to the printer unit.

10. The method of controlling the image forming apparatus according to claim 7, wherein the number of printed sheets is added to a printing job.

11. The method of controlling the image forming apparatus according to claim 7, wherein the test page is information in order to confirm a printing state, when a toner cartridge or a component is changed.

12. The method of controlling the image forming apparatus according to claim 7, wherein the set page is information in order to confirm settings of information of printing resolution, printing speed, attached options of the image forming apparatus, or information such as set environment of the image forming apparatus on the network.

13. An image forming apparatus having a printer unit which prints print data, and a printer controller which controls a printing operation of the printer unit,
   wherein the printer controller comprises:

a first storing means for storing registered division management identification information of a division which is to be permitted to print the print data;

means for detecting input identification information added to a printing job at a printing request time of the printing job;

means for judging whether or not the input identification information detected by the detecting means agrees with the registered division management identification information stored in the first storage section;

means for permitting the printer unit to print the printing job in a case where the judging means judges that the information agree with each other and which does not permit the printing of the printing job at the time of disagreement;

a second storing means for storing information of a division limited sheet number in order to manage the number of printed sheets with respect to the division; and means for counting the number of the printed sheets at the printing request time of the division and which judges whether or not the division limited sheet number stored in the second storage section is exceeded and which permits the printer unit to print the data within the limited sheet number and which does not permit the printer unit in a case where the limited sheet number is exceeded;

means for storing a test page or a set page; and means for printing the test page or the set page when the detection means detects an input of special division management identification information wherein the divisional printing limitation is not applied when the input of the special division management identification information is detected.

14. The image forming apparatus according to claim 13, further comprising:

a third storing means for storing division management identification information of a division which is not permitted by the permitting means or the counting means.

15. The image forming apparatus according to claim 13, wherein a scanner unit is further provided which reads a draft and sends the read data to the printer unit.

16. The image forming apparatus according to claim 13, wherein the number of printed sheets is added to a printing job.

17. The image forming apparatus according to claim 13, wherein the test page is information in order to confirm a printing state, when a toner cartridge or a component is changed.

18. The image forming apparatus according to claim 13, wherein the set page is information in order to confirm settings of information of printing resolution, printing speed, attached options of the image forming apparatus, or information such as set environment of the image forming apparatus on the network.

* * * * *